United States Patent [19]

Banjo et al.

[11] Patent Number: 4,864,116

[45] Date of Patent: Sep. 5, 1989

[54] MECHANISM FOR CONNECTING AN IC CARD TO AN EXTERNAL DEVICE

[75] Inventors: Toshinobu Banjo; Tetsuya Ueda; Shigeo Onoda; Yasushi Kasatani, all of Itami, Japan

[73] Assignee: Mitsubishi Denki Kabushiki Kaisha, Japan

[21] Appl. No.: 166,362

[22] Filed: Mar. 10, 1988

[30] Foreign Application Priority Data

Mar. 12, 1987 [JP] Japan ................. 62-59154
Mar. 31, 1987 [JP] Japan ................. 62-79916
Mar. 31, 1987 [JP] Japan ................. 62-79927

[51] Int. Cl.⁴ .................................. G06K 19/06
[52] U.S. Cl. .......................... 235/492; 235/441
[58] Field of Search ........................ 235/492, 441

[56] References Cited

U.S. PATENT DOCUMENTS

| | | | |
|---|---|---|---|
| 2,802,188 | 11/1955 | Badders | 339/17 |
| 3,343,582 | 6/1964 | Blight et al. | 285/82 |
| 3,906,201 | 9/1975 | Housman | 235/492 |
| 4,044,229 | 8/1977 | Samreus | 235/492 |
| 4,046,994 | 9/1977 | Prohaska | 235/492 |
| 4,532,419 | 7/1985 | Takeda | 235/492 |
| 4,695,925 | 9/1987 | Kodai et al. | 361/395 |
| 4,791,608 | 12/1988 | Fushimoto | 365/52 |

FOREIGN PATENT DOCUMENTS 1200409  9/1965  Fed. Rep. of Germany .
59-127284  7/1984  Japan .

*Primary Examiner*—Harold I. Pitts
*Attorney, Agent, or Firm*—Leydig, Voit & Mayer

[57] ABSTRACT

A mechanism for connecting an IC card and an external device to each other, having: a plurality of electrode terminals formed on a package of the IC card incorporating a semiconductor device and used to connect the semiconductor device to the external device; at least one engagement recess and/or engagement projection formed on the package of the IC card; and a connector provided in the external device. This connector is provided with an insertion hole, a plurality of electrode-contacting pieces disposed in the insertion hole and capable of contacting the plurality of electrode terminals of the IC card when the IC card is inserted into the connector, and at least one engagement projection and-/or engagement recess formed inside the insertion hole and capable of engaging the engagement recess and/or engagement projection formed on the package to enable a particular type of the IC card to be inserted into the connector.

9 Claims, 4 Drawing Sheets 4,864,116

MECHANISM FOR CONNECTING AN IC CARD TO AN EXTERNAL DEVICE

BACKGROUND OF THE INVENTION

This invention relates to a mechanism for connecting an IC card, such as a game-program IC card, to an external device, such as a card reader for reading the contents of a memory stored in the IC card, and relates more particularly to an improvement which resides in allowing only a predetermined type of card to be inserted into and connected to the connection mechanism.

A conventional connection mechanism between an IC card and an external device has a construction such as that shown in FIGS. 1 to 4B. FIGS. 1 and 2 are perspective views in which the obverse surface and the bottom surface of an IC card 1 can be seen, respectively. The IC card 1 is constituted by a package 2 which consists of a frame 2a and panels 2b attached to the upper and lower sides of the frame 2a, and which incorporates a semiconductor device 1a. A multiplicity of electrode terminals 3 are disposed on an obverse-side portion of the frame 2a at one end thereof and for connecting the semiconductor device 1a to the external device.

FIG. 3 is a front view of a connector 6 which is provided in a card reader (not shown) used as the external device and into which the card 1 is inserted so that the card is electrically connected by means of contacts to the card reader. FIGS. 4A and 4B are sectional views taken along the line IV—IV of FIG. 3, illustrating a state in which the card 1 is not inserted into the connector and a state in which it is inserted into the connector. The connector 6 has a frame body 7 made of an insulating material such as a synthetic resin, and a multiplicity of electrode-contacting pieces 8 are fixed to an innermost portion of the frame body 7. The frame body 7 has an insertion hole 7a through which the card 1 is inserted, and an entrance 7b which is expanded relative to the insertion hole 7a so as to facilitate the insertion of the card 1.

To use the card 1, the card 1 is inserted into the insertion hole 7a formed in the frame body 7 of the connector 6, and the electrode terminals 3 disposed on the card 1 are brought into contact with the corresponding electrode-contacting pieces 8 disposed in the connector 6 so that the card 1 is electrically connected to the external device. This state is shown in FIG. 4B.

However, this conventional IC card connection mechanism has the following disadvantages. Ordinarily, there are several types of IC cards used with this type of connection mechanism, and it is possible that a type of IC card which is not authorized for use with a particular card reader can be inserted into the connector 6 of this card reader. In addition, it is difficult for a maker of card readers or IC cards to provide compatibility for its own products alone.

SUMMARY OF THE INVENTION

The present invention has been achieved with a view to overcoming these problems, and an object of the present invention is to provide a mechanism for connecting an IC card to an external device and designed to ensure that a card which is not authorized for use with a particular external device cannot be connected to the external device even if it is inserted into a connector provided in the external device or that it cannot be inserted into the connector.

To this end, the present invention provides a mechanism for connecting an IC card to an external device, in which at least one engagement projection or recess is formed on a wall of an insertion hole formed in a frame body of a connector provided in the external device, while an engagement recess or projection capable of engaging the engagement projection or recess in the insertion hole when the card is inserted into the connector is formed on the IC card.

In accordance with the present invention, if the card having an engagement recess is inserted into the insertion hole of the connector provided in the external device, it can be completely inserted into the insertion hole to an innermost portion thereof while its engagement recess engages with an engagement projection formed in the insertion hole, thereby establishing electrical connection between terminal members of the card and the connector. If a card which is not authorized for use with this external device and which has no predetermined engagement recess is inserted into the insertion hole of the connector, the front end of the card abuts against the engagement projection and is thereby stopped from being further inserted, so that no electrical connection is established between the terminals and, therefore, preventing use of this card.

DETAILED DESCRIPTION OF THE PREFERRED EMBODIMENT

Figure 1:
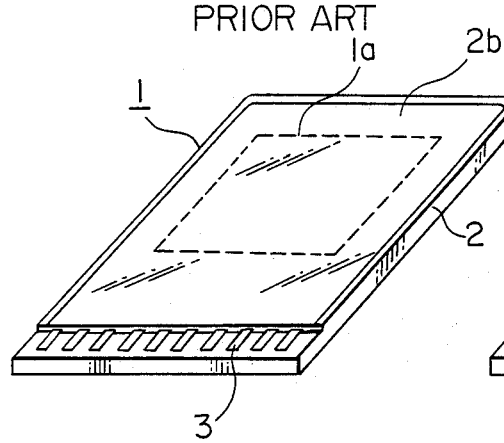
FIG. 1 is a perspective view of the obverse side of a conventional IC card.
Figure 2:
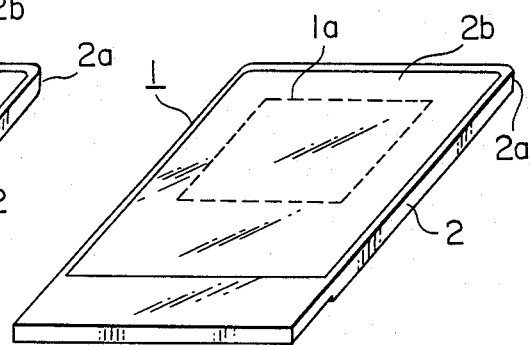
FIG. 2 is a perspective view of the reverse side of the conventional IC card shown in FIG. 1.
Figure 5:
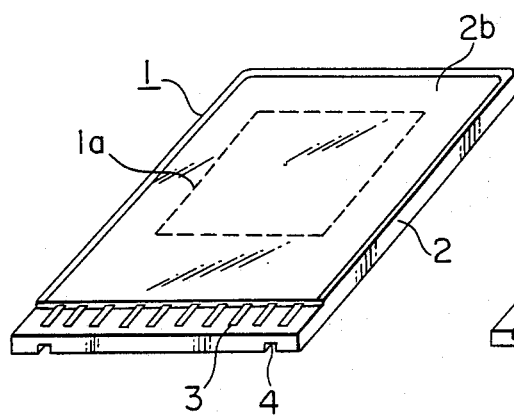
FIG. 5 is a perspective view from the obverse side of an IC card in accordance with a first embodiment of the present invention.
Figure 6:
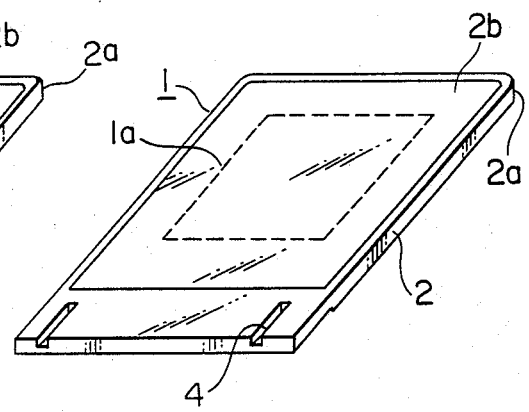
FIG. 6 is a perspective view of the reverse side of the IC card shown in FIG. 5.

FIGS. 5 to 8B show a mechanism for connecting an IC card to an external device which represents an embodiment of the present invention. FIGS. 5 and 6 are perspective views of an IC card 1 from the obverse and reverse sides, respectively. The IC card 1 in accordance with this embodiment differs from the conventional IC card shown in FIGS. 1 and 2, in that it has a pair of engagement recesses 4 which are formed in the reverse surface of the package 2. The engagement recesses 4 extend in the direction of insertion of the package 2 from the front end of the package at opposite sides thereof.

Figure 3:
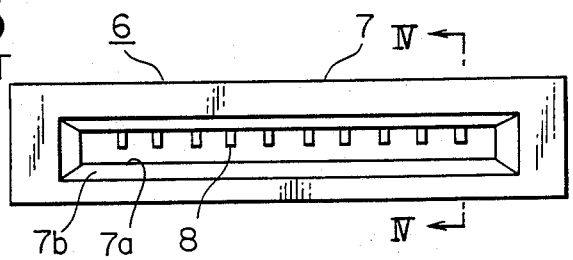
FIG. 3 is a front view of a conventional connector provided in an external device.
Figure 4A:
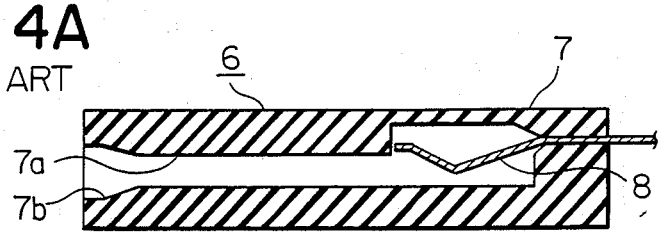
FIG. 4A is a cross-sectional view taken along the line IV—IV of FIG. 3.
Figure 4B:
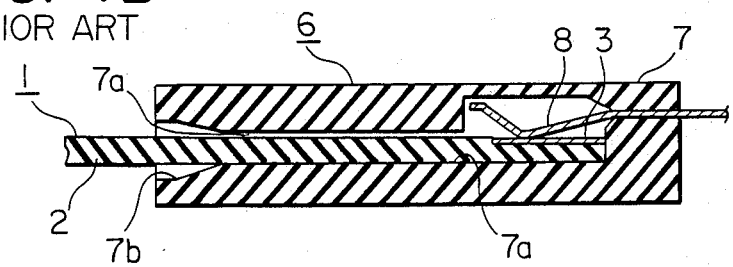
FIG. 4B is a cross-sectional view taken along the line IV—IV of FIG. 3, illustrating a state in which the IC card is inserted into the connector.
Figure 7:
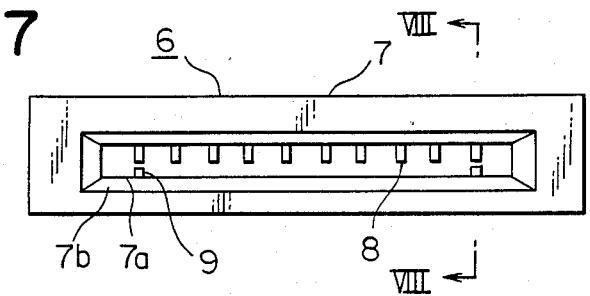
FIG. 7 is a front view of a connector in accordance with the first embodiment of the present invention.
Figure 8A:
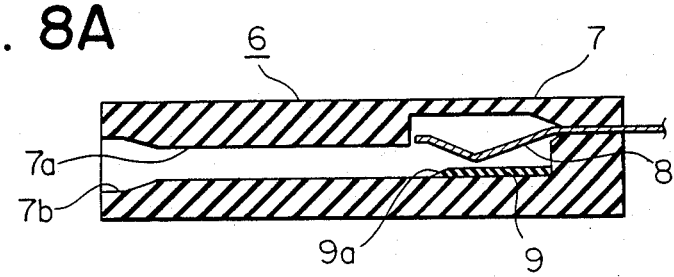
FIG. 8A is a cross-sectional view taken along the line VIII—VIII of FIG. 7.
Figure 8B:
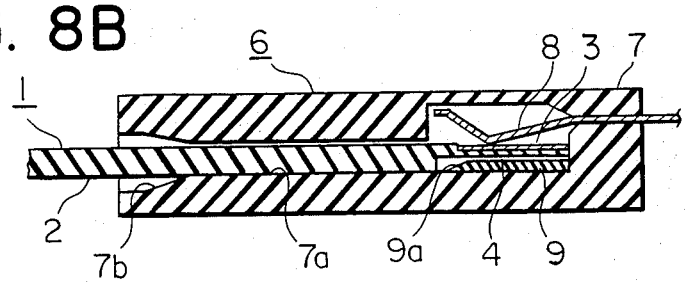
FIG. 8B is a cross-sectional view taken along the line VIII—VIII of FIG. 7, illustrating the IC card shown in FIGS. 5 and 6 inserted into the connector.

FIG. 7 is a front view of a connector 6 which is provided in a card reader (not shown), and FIGS. 8A and 8B are sectional side views taken along the line VIII—VIII of FIG. 7, illustrating the card 1 when not inserted into the connector and with the card inserted into the connector, respectively. The connector 6 in accordance with this embodiment differs from the conventional connector shown in FIG. 3 in that it has a pair of engagement projections 9 which are formed on one of two major side walls, that is the lower wall, at the bottom of the insertion hole 7a of the frame body 7. The engagement projections 9 extend in the direction of insertion for engagement with the engagement recesses 4 of the card 1 respectively to enable the card 1 to be fitted into the connector.

When the card 1 is inserted into the insertion hole 7a of the connector 6, the engagement projections 9 of the connector 6 engage with the engagement recesses 4 of the package 2, and the card 1 is allowed to reach the innermost portion of the connector, as shown in FIG. 8B, so that the electrode terminals 3 are brought into contact with the corresponding electrode-contacting pieces 8.

If a different type of card without the recess 4 formed at the desired positions is inserted into the connector 6, the front end of the card abuts against the engagement projections 9 and does not reach the innermost portion of the connector. Therefore, this card cannot be fitted into the connector and it is inhibited from establishing electrical contact. It can therefore be determined that this card is not of the specified type and therefore cannot be used. In addition, this mechanism prevents the card from being inserted wrong side up, and also functions to protect the electrode-contacting pieces 8 of the connector by inhibiting the insertion of a wrong card into the innermost section of the insertion hole.

FIGS. 9 to 11B show another embodiment of the present invention. An IC card 1 shown in FIG. 9 has a pair of elongated engagement recesses 5 which are formed in the reverse surface of the package 2. The engagement recesses 5 extend in the direction of insertion from the front end of the package at opposite sides thereof. A connector 6 shown in FIGS. 10, 11A, and 11B has a pair of elongated engagement projections 10 which extend from the front end of the insertion opening 7b to the innermost end of the insertion hole 7a respectively. The engagement projections 10 respectively engage the engagement recesses 5 of the card 1 so as to enable the card 1 to be fitted into the connector.

Figure 9:
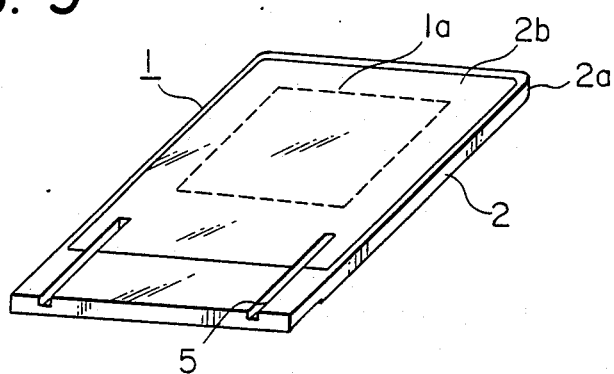
FIG. 9 is a perspective view of the obverse side of an IC card in accordance with a second embodiment of the present invention.
Figure 10:
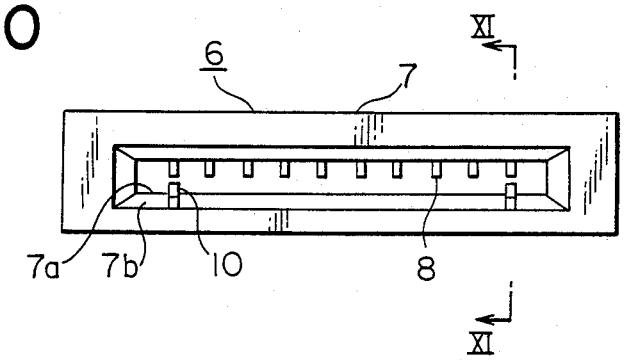
FIG. 10 is a front view of a connector in accordance with the second embodiment of the present invention.
Figure 11A:
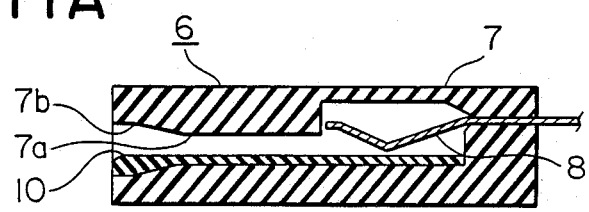
FIG. 11A is a cross-sectional view taken along the line XI—XI of FIG. 10.
Figure 11B:
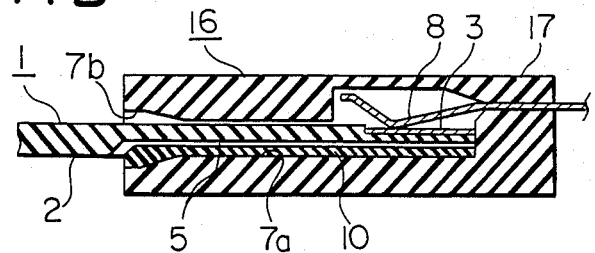
FIG. 11B is a cross-sectional view taken along the line XI—XI of FIG. 10, illustrating the IC card shown in FIG. 9 inserted into the connector.

When the card 1 shown in FIG. 9 is inserted into the insertion hole 7a of the connector 6 shown in FIG. 10, the engagement projections 10 of the connector 6 engage with the engagement recesses 5 of the package 2, and the card 1 is allowed to reach the innermost portion of the connector, as shown in FIG. 11B, so that the electrode terminals 3 are brought into contact with the corresponding electrode-contacting pieces 8.

As described above, the engagement projections extending in the direction of insertion are formed on an inner wall of the insertion hole of the connector provided in the card reader while the engagement recesses capable of engaging with the engagement projections and enabling the card to be fitted into the connector are formed in the card. This simple mechanism ensures that only an authorized type of card can be used by being inserted into the connector and connected to the card reader while a card which is not authorized for use with this card reader is prevented from being fitted into the connector. Inefficiency or damage due to errors in using the card, including inserting the card wrong side up, are thereby prevented.

Figure 12:
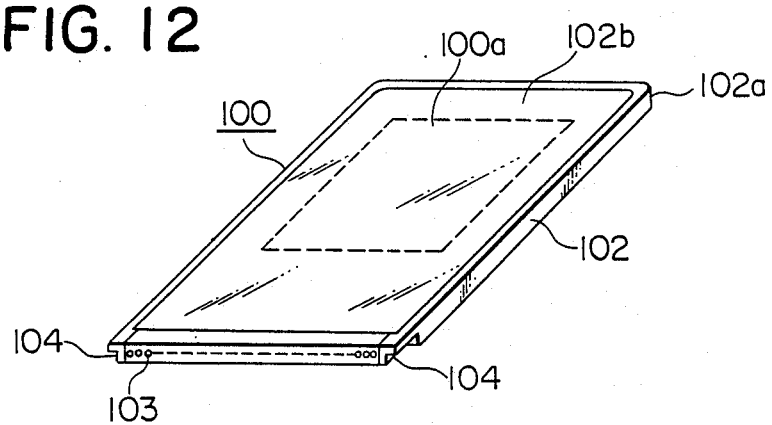
FIG. 12 is a perspective view of the obverse side of an IC card in accordance with a third embodiment of the present invention.

FIGS. 12 to 14B show still another embodiment of the present invention. FIG. 12 shows an IC card 100 with the obverse surface facing upward, which is different from the above-described type of IC card. The card 100 has a package 102 which is constituted by a frame 102a and panels 102b attached to the upper and lower sides of the frame 102a and which incorporates a semiconductor device 100a. A multiplicity of female-type electrode terminals 103 are disposed in a front surface of the package 102. A pair of engagement recesses 104 are formed at side-front corners of the package 102 on the side of the reverse surface thereof. The engagement recesses 104 extend in the direction of insertion.

Figure 13:
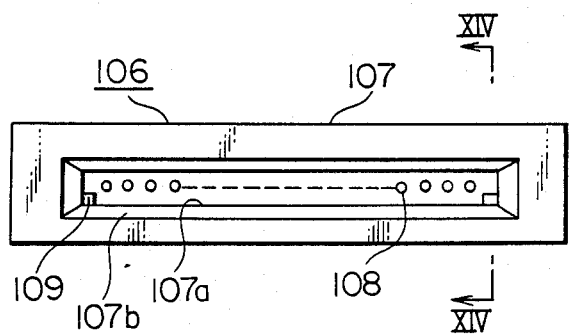
FIG. 13 is a front view of a connector in accordance with the second embodiment of the present invention.
Figure 14A:
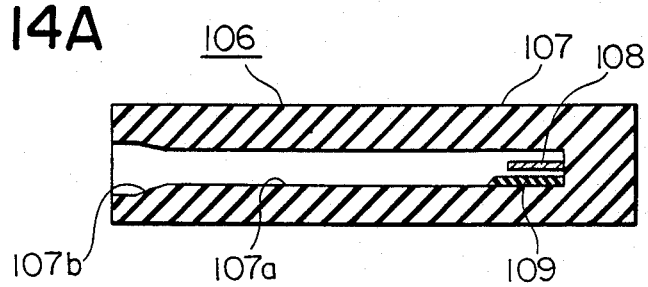
FIG. 14A is a cross-sectional view taken along the line XIV—XIV of FIG. 13.
Figure 14B:
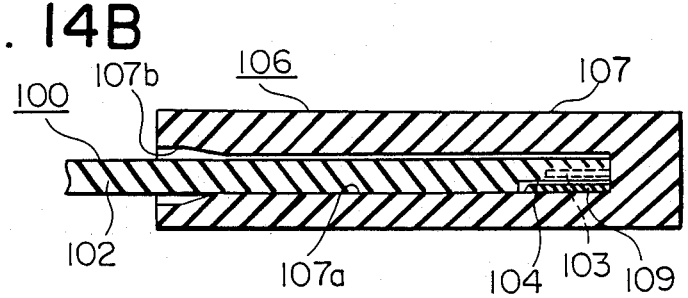
FIG. 14B is a cross-sectional view taken along the line XIV—XIV of FIG. 13, illustrating the IC card shown in FIG. 12 inserted into the connector.

FIG. 13 is a front view of a connector 106 provided in a card reader (not shown). FIGS. 14A and 14B are sectional side views illustrating the card 100 when it is not inserted into the connector 106 and with the card is inserted into the connector, respectively. The connector 106 has a frame body 107 which is made of an insulating material such as a synthetic resin and in which insertion holes 107a are formed. A multiplicity of electrode-contacting pins 108 are disposed in an innermost wall of the insertion hole facing the front surface of the package. A pair of engagement projections 109 extending in the direction of insertion are disposed on the lower wall of the insertion hole 107a of the frame body 107 near the bottom and minor side walls thereof. These projections engage the engagement recesses 104 and enable the card 100 to be inserted into the connector only when the obverse surface of the card 100 faces upward, as viewed in FIGS. 13 to 14B.

Additionally, in a conventional IC card similar to that shown in FIG. 12 in which the female-type electrode terminals 103 are disposed in the front surface of the package 102, the electrode terminals are not exposed in either the obverse or reverse surface, the configuration of the card seen from the upper and lower sides is substantially the same and, therefore, there is difficulty in discriminating between the upper side and lower sides of the IC card. Hence, there is a possibility of the card being inserted wrong side up.

When the card 100 in accordance with the present invention is inserted into the insertion hole 107a of the connector 106 with its obverse surface facing upward, the engagement recesses 104 of the package 102 engage with the engagement projections 109 so that the card can be inserted into the innermost portion of the connector, thereby enabling the electrode terminals 103 to be fitted around and brought into contact with the corresponding electrode-contacting pins 108, as shown in FIG. 14B.

The provision of the engagement recesses 104 in the front portions of the card 100 enables discrimination between the obverse or reverse surfaces. If the card 100 is inserted into the connector by mistake with its obverse surface facing downward, the side of the package 102 on which the engagement recesses 14 are not formed faces downward, the front end of the package 102 abuts against the engagement projections 109 of the frame body 107, thereby prohibiting the card 100 from being inserted further and brought into contact with the pins 108.

In the use of the thus-constructed card with obverse and reverse surfaces which are substantially identical and in which female-type electrode terminals are disposed in the front surface of the package, the type of card can be determined by the provision of engagement recesses in the card and engagement projections in the insertion hole of the connector of the external device as well as by whether or not the direction in which the obverse or reverse surface of the card faces is right. Even if the card is inserted wrong side up, it is stopped halfway, thereby preventing deformation of the electrode-contacting pins of the connector and breakdown of the semiconductor device in the card due to false connection.

In the above-described embodiments, the engagement recesses are formed on the IC card, and the engagement projections are formed on the connector, but engagement projections may be formed on the IC card while engagement recesses for engagement therewith are formed on the connector. The shapes, numbers, and positions of these engagement recesses and engagement projections are not limited to those of the above-described embodiments and they can be suitably selected in accordance with the shape of the connector, the disposition of the electrode terminals, and so forth. For instance, engagement projections having a V-shaped or U-shaped cross section and engagement recesses having the corresponding sectional configuration may be formed on side surfaces or upper surfaces of the IC card and the insertion hole. In addition, the front end of each engagement projection and/or the entrance of each engagement recess may have chamfered portions 9a and 4a, as shown in FIGS. 8A and 8B, thereby enabling these portions to smoothly engage each other.

What is claimed is:

1. A mechanism for connecting an IC card to an external device comprising:
   a plurality of electrode terminals formed on a package of an IC card incorporating a semiconductor device and used to connect the semiconductor device to an external device, said package having a thickness between opposed obverse and reverse sides;
   at least one engagement recess and/or engagement projection formed in and/or on said package of said IC card on one of said sides and having a depth and/or projection less than the thickness of said package;
   a connector provided in an external device and having an insertion hole, a plurality of electrode-contacting pieces disposed in the insertion hole for contacting said plurality of electrode terminals when said package is inserted into said connector, and at least one complementary engagement projection and/or engagement recess formed inside the insertion hole for engaging said engagement recess and/or engagement projection formed in and/or on said package when said package is inserted into said connector.

2. A mechanism for connecting an IC card to an external device according to claim 1 wherein said plurality of electrode terminals are disposed on said package in the direction for insertion of said package into said connector and are exposed on the obverse surface of said package at the end thereof for insertion into the connector, and said plurality of electrode-contacting pieces of said connector are disposed along an inner wall portion of said insertion hole for facing said electrode terminals on said package.

3. A mechanism for connecting an IC card to an external device according to claim 2 wherein said insertion hole is defined by two major walls and two minor walls and said connector has a pair of first engagement projections or recesses formed in one of said two major walls of said insertion hole of said connector for facing the reverse surface of said package, said first engagement projections or recesses extending along the direction of insertion of said package into said connector, said package having a pair of second engagement recesses or projections formed in said package on said reverse surface extending from the end of said package for insertion into said connector along the direction of insertion of said IC card into said connector for engaging with said first engagement projections or recesses.

4. A mechanism for connecting an IC card to an external device according to claim 3 wherein at least one of said first and second engagement recesses or projections is chamfered to enable smooth engagement of said engagement recesses with said engagement projections.

5. A mechanism for connecting an IC card to an external device according to claim 1 wherein said plurality of electrode terminals formed on said package of said IC care are a plurality of electrode terminals of a female-type facing in the direction of insertion of said package in said connector, and said plurality of electrode-contacting pieces formed in said connector are a plurality of electrode-contacting pieces of a male-type extending from a wall of said insertion hole for engaging said plurality of female-type electrode terminals formed on said package.

6. A mechanism for connecting an IC card to an external device according to claim 5 wherein said insertion hole is defined by two major walls and two minor walls and said connector has a pair of first engagement projections or recesses formed in one of said two major walls of said insertion hole of said connector and extending along the direction of insertion of said package into said connector, and said package has a pair of second engagement recesses or projections formed in and/or on said package on one of the obverse and reverse surfaces facing said one of said major walls extending from said package along the direction of insertion of said package into said connector for engaging said first engagement projections or recesses, thereby preventing said IC card from being inserted wrong side up.

7. A mechanism for connecting an IC card to an external device according to claim 6 wherein at least one of said first and second engagement recesses or projections is chamfered to enable smooth engagement of said engagement recesses with said engagement projections.

8. A mechanism for connecting an IC card to an external device according to claim 6 wherein said first engagement projections or recesses are formed in one of said major walls of said insertion hole and at one of said minor walls thereof, and said second engagement recesses or projections are formed in and/or on a surface of said package for facing said one of said major walls of said insertion hole, thereby preventing said IC card from being inserted wrong side up.

9. A mechanism for connecting an IC card to an external device according to claim 8 wherein at least one of said first and second engagement recesses or projections is chamfered to enable smooth engagement of said engagement recesses with said engagement projections.

* * * * *